(12) United States Patent
Hakola et al.

(10) Patent No.: US 10,893,544 B2
(45) Date of Patent: Jan. 12, 2021

(54) BEAM REFINEMENT IN TWO-STEP RANDOM ACCESS CHANNEL (RACH) PROCEDURE

(71) Applicant: NOKIA TECHNOLOGIES OY, Espoo (FI)

(72) Inventors: Sami-Jukka Hakola, Kempele (FI); Emad Farag, Flanders, NJ (US); Timo Koskela, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/276,364

(22) Filed: Feb. 14, 2019

(65) Prior Publication Data
US 2020/0267768 A1    Aug. 20, 2020

(51) Int. Cl.
| | |
|---|---|
| *H04W 74/08* | (2009.01) |
| *H04B 7/06* | (2006.01) |
| *H04L 5/00* | (2006.01) |
| *H04L 1/00* | (2006.01) |
| *H04B 7/0408* | (2017.01) |
| *H04W 56/00* | (2009.01) |
| *H04B 7/0413* | (2017.01) |

(52) U.S. Cl.
CPC ...... *H04W 74/0833* (2013.01); *H04B 7/0408* (2013.01); *H04B 7/0626* (2013.01); *H04L 1/0003* (2013.01); *H04L 5/0048* (2013.01); *H04W 56/001* (2013.01); *H04B 7/0413* (2013.01)

(58) Field of Classification Search
CPC ............. H04W 74/006; H04W 74/08; H04W 74/0833; H04W 56/00; H04W 56/001; H04L 5/00; H04L 5/0048; H04L 1/0003; H04B 7/0408; H04B 7/0413; H04B 7/0626
See application file for complete search history.

(56) References Cited

U.S. PATENT DOCUMENTS

| | | | | |
|---|---|---|---|---|
| 2018/0124626 A1* | 5/2018 | Tsai | ...... | H04W 24/10 |
| 2018/0160453 A1* | 6/2018 | Lee | ...... | H04W 72/04 |
| 2019/0364599 A1* | 11/2019 | Islam | ...... | H04W 74/006 |
| 2020/0015236 A1* | 1/2020 | Kung | ...... | H04W 72/082 |
| 2020/0053779 A1* | 2/2020 | Jeon | ...... | H04W 74/02 |

* cited by examiner

*Primary Examiner* — Kan Yuen
(74) *Attorney, Agent, or Firm* — Brake Hughes Bellermann LLP (57) ABSTRACT

A method, apparatus, and a computer-readable storage medium for beam refinement of a two-step random access channel (RACH) procedure are provided. In some implementations, the method may include receiving a plurality of synchronization signal blocks (SSBs), a plurality of channel state information-reference signals (CSI-RSs) associated with each of the plurality of synchronization signal blocks (SSBs), and random access channel (RACH) configuration data from a gNB. The method may further include transmitting a first message of the two-step random access channel (RACH) procedure to the gNB, the first message including a first portion and a second portion. The first portion includes a preamble associated with a selected channel state information-reference signal (CSI-RS) of the plurality of channel state information-reference signals (CSI-RSs) and the second portion includes data associated with the preamble, and the data transmitted using pre-configured or pre-allocated resources.

13 Claims, 9 Drawing Sheets

BEAM REFINEMENT IN TWO-STEP RANDOM ACCESS CHANNEL (RACH) PROCEDURE

TECHNICAL FIELD

This description relates to wireless communications, and in particular, to two-step random access channel (RACH) procedure.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium for beam refinement of a two-step random access channel (RACH) procedure are provided.

In some implementations, the method may include receiving a plurality of synchronization signal blocks (SSBs), a plurality of channel state information-reference signals (CSI-RSs) associated with each of the plurality of synchronization signal blocks (SSBs), and random access channel (RACH) configuration data from a gNB. The random access channel (RACH) configuration data is associated with a two-step random access channel (RACH) procedure. The method may further include transmitting a first message of the two-step random access channel (RACH) procedure to the gNB, the first message including a first portion and a second portion. In addition, the first portion includes a preamble associated with a selected channel state information-reference signal (CSI-RS) of the plurality of channel state information-reference signals (CSI-RSs), the selected channel state information-reference signal (CSI-RS) further associated with a selected synchronization signal block (SSB) of the plurality of synchronization signal blocks (SSBs), and the second portion includes data associated with the preamble, and the data transmitted using pre-configured or pre-allocated resources.

DETAILED DESCRIPTION

Figure 1:
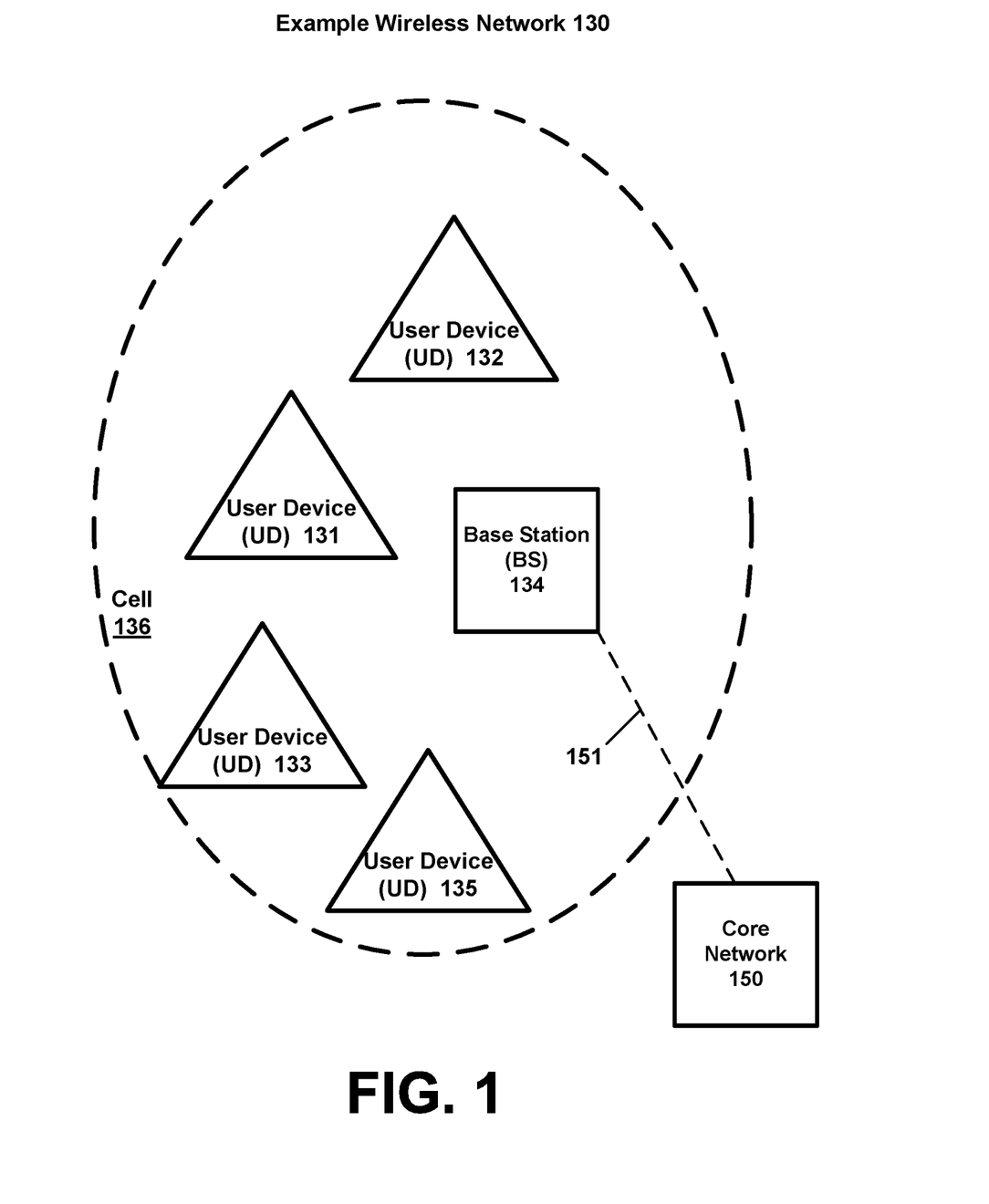
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g. 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In wireless communications, when a user equipment (UE) sends a first message of random access procedure to a network entity (e.g., gNB), the UE may send a specific pattern or signature which is called as a random access channel (RACH) preamble. The gNB uses the preambles (or the preamble values) to differentiate between requests coming from different UEs. A total of 64 preambles are available to the UE for the very first message of random access procedure and UE will decide any one of them randomly for contention-based random access procedure. For non-contention based procedure, network informs UE the preamble to use.

A typical RACH procedure may include four steps or two steps based on whether the RACH procedure is a four-step or a two-step the RACH procedure. In some implementations, the four-step RACH procedure may include the following: a) Step 1—Msg. 1—UE selects one of the 64 available RACH preambles and sends it to a gNB, for example, using a random access radio network temporary identity (RA-RNTI) as an identifier; b) Step 2—Msg. 2—gNB sends Random Access Response (RAR) to the UE on a downlink shared channel (DL-SCH) addressed to the RA-RNTI calculated from the timeslot in which the preamble was sent. In some implementations, the Msg2 may include the following information: Temporary cell-RNTI (C-RNTI)—gNB gives another identity to UE which is called temporary C-RNTI (cell radio network temporary identity) for further communication; Timing Advance Value: gNB informs UE to change its timing so it can compensate for the round trip delay caused by UE distance from the gNeB; and Uplink Grant Resource: gNB will assign initial resource to UE so that it can use UL-SCH (Uplink shared channel); c) Step 3—Msg. 3—Using UL-SCH, UE sends RRC connection request message to gNB. UE is identified by temporary C-RNTI (assigned previously by gNB). In some implementations, Msg. 3 may include following—UE identity (TMSI or Random Value)—The TMSI is used if the UE has previously connected to the same network. With TMSI value, the UE is identified in the core network; Random value is used if UE is connecting for the very first time to network. The random value or TMSI are needed as the Temporary-CRNTI may have assigned to more than one UEs previously, due to multiple requests coming at same time; and Connection establishment cause: This shows the reason why the UE needs to connect to network; d) Step 4—Msg. 4—gNB responds with contention resolution message to the UE whose message was successfully received in Step 3. This message is addressed towards TMSI value or Random number (from previous steps) but may include the new C-RNTI which may be used for the further communication.

The present disclosure provides beam refinement in the two-step RACH procedure. In general, beam refinement refers to a procedure where a coarse beam direction and beamwidth are obtained first followed by a refined beam direction and potentially narrower beamwidth. Beam refinement procedure may be used to refine transmit and/or receive beams and/or when a UE is any RRC mode.

In some implementations, the method may include receiving a plurality of synchronization signal blocks (SSBs), a plurality of channel state information-reference signals (CSI-RSs) associated with each of the plurality of synchronization signal blocks (SSBs), and random access channel (RACH) configuration data from a gNB. The random access channel (RACH) configuration data is associated with a two-step random access channel (RACH) procedure. The method may further include transmitting a first message of the two-step random access channel (RACH) procedure to the gNB, the first message including a first portion and a second portion. In addition, the first portion includes a preamble associated with a selected channel state information-reference signal (CSI-RS) of the plurality of channel state information-reference signals (CSI-RSs), the selected channel state information-reference signal (CSI-RS) further associated with a selected synchronization signal block (SSB) of the plurality of synchronization signal blocks (SSBs), and the second portion includes data associated with the preamble, and the data transmitted using pre-configured or pre-allocated resources.

Figure 2:
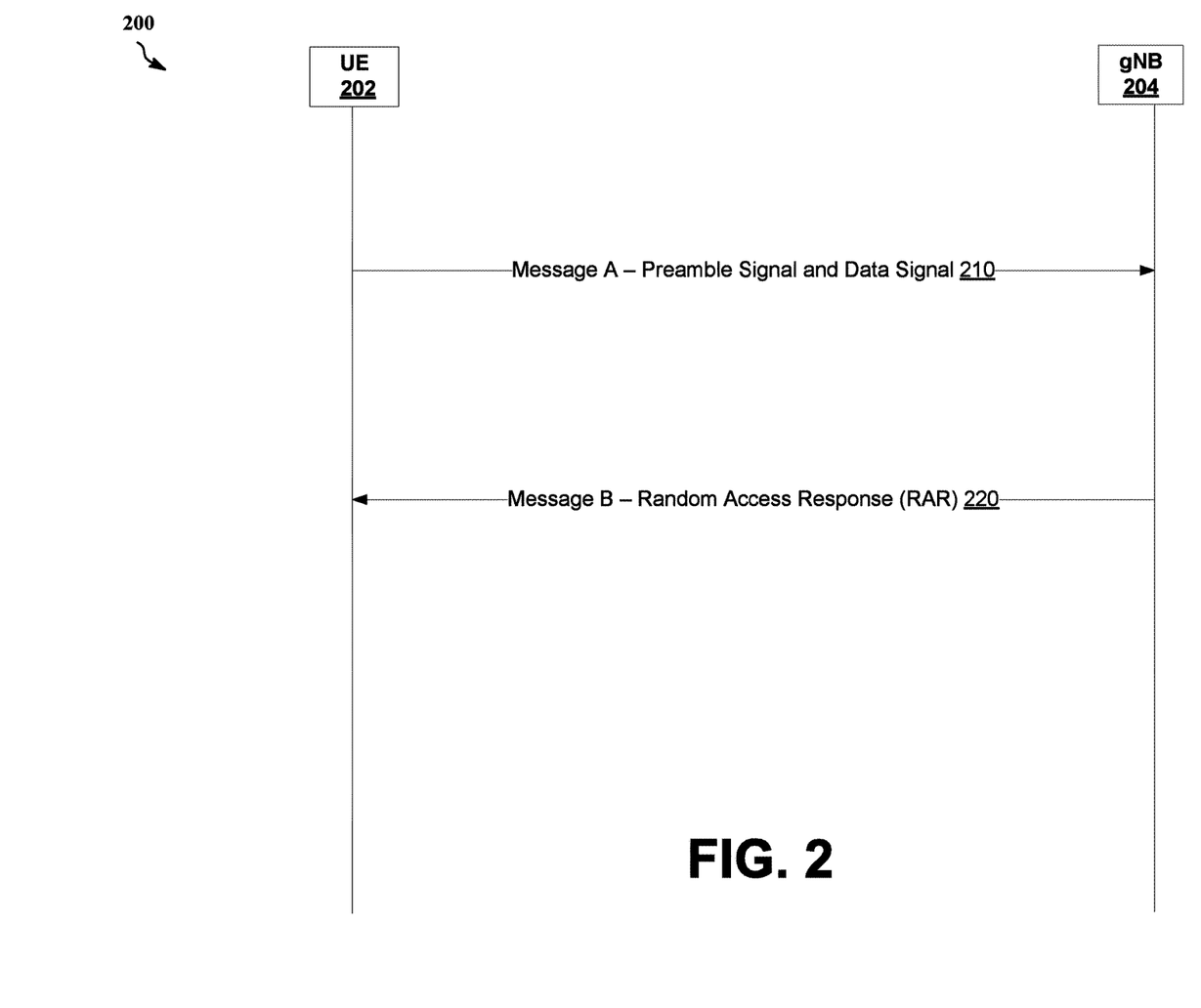
FIG. 2 is a message flow diagram illustrating a two-step random access channel (RACH) procedure, according to one example implementation.

FIG. 2 is a message flow diagram 200 illustrating a two-step random access channel (RACH) procedure, according to one example implementation. The two-step RACH procedure is a simplified RACH procedure to achieve lower control overhead and/or lower latency (when compared to the four-step RACH procedure).

In an example implementation, UE 202 may initiate the two-step RACH procedure. The two-step RACH procedure may be initiated based on RACH configuration data received from a gNB 202. In some implementations, the two-step RACH procedure includes two messages, Message A 210 (e.g., Msg. A or a first message of the two-step RACH procedure) and Message B 220 (e.g., Msg. B or a second message of the two-step RACH procedure). In some implementations, in the two-step RACH procedure, Msg. A 210 may include Msg. 1 (preamble signal) and Msg. 3 (data signal) of the four-step RACH procedure; and Msg. B 210 may include Msg. 2 (random access response) and Msg. 4 (contention resolution) of the four-step RACH procedure. The data signal of Msg. A 210 may be sent grant-free (e.g., using pre-configured resources).

In some implementations, in the two-step RACH procedure, UE 202 may randomly select a preamble (e.g., a preamble sequence) for transmission and transmit the data signal (e.g., data) in the associated data resource. The demodulation reference signals (DMRS) for physical uplink shared channel (PUSCH) to carry the data signal may be associated with one-to-one or many-to-one mapping with the transmitted preamble sequence. In order to achieve a certain level of flexibility, gNB 204 may configure a set of modulation coding schemes (MCSs) to be used. UE 202, based on the configuration, may select an MCS (from the configured MCSs) for the data transmission. The selected MCS may be indicated in an accompanied control channel or may be blindly detected by gNB 204.

In some implementations, to avoid excessive resource reservation, overbooking for PUSCH resource(s) may be needed. This may result in many-to-one mapping between the set of preambles and PUSCH resource. Thus, collisions are more likely for the data portion than for the preambles. Therefore, there is a need/desire to address the coverage issue typically experienced by the data signal of Msg. A in the two-step RACH procedure. In some implementations, a beam refinement mechanism may be used for the data signal (or data portion) of Msg. A to address the above described problem. In some implementations, a fall back to the four-step RACH procedure may be used. For example, gNB 204 may detect the preamble, but unable to decode Msg. A data because of a collision. In such a case, from the gNB point of view, the message detected in the two-step RACH procedure may be the same as that of Msg. 1 in the four-step RACH procedure, where only the preamble is transmitted and detected as part of Msg. 1. The gNB may use the four-step RACH procedure (as a fall-back procedure) and send Msg. 2 to the UE, indicating the detected preamble ID, the allocated UE-ID, and timing advance (if needed). Msg. 3 and Msg. 4 may follow the four-step RACH procedure. The beam refinement mechanism is described below in detail.

Figure 3:
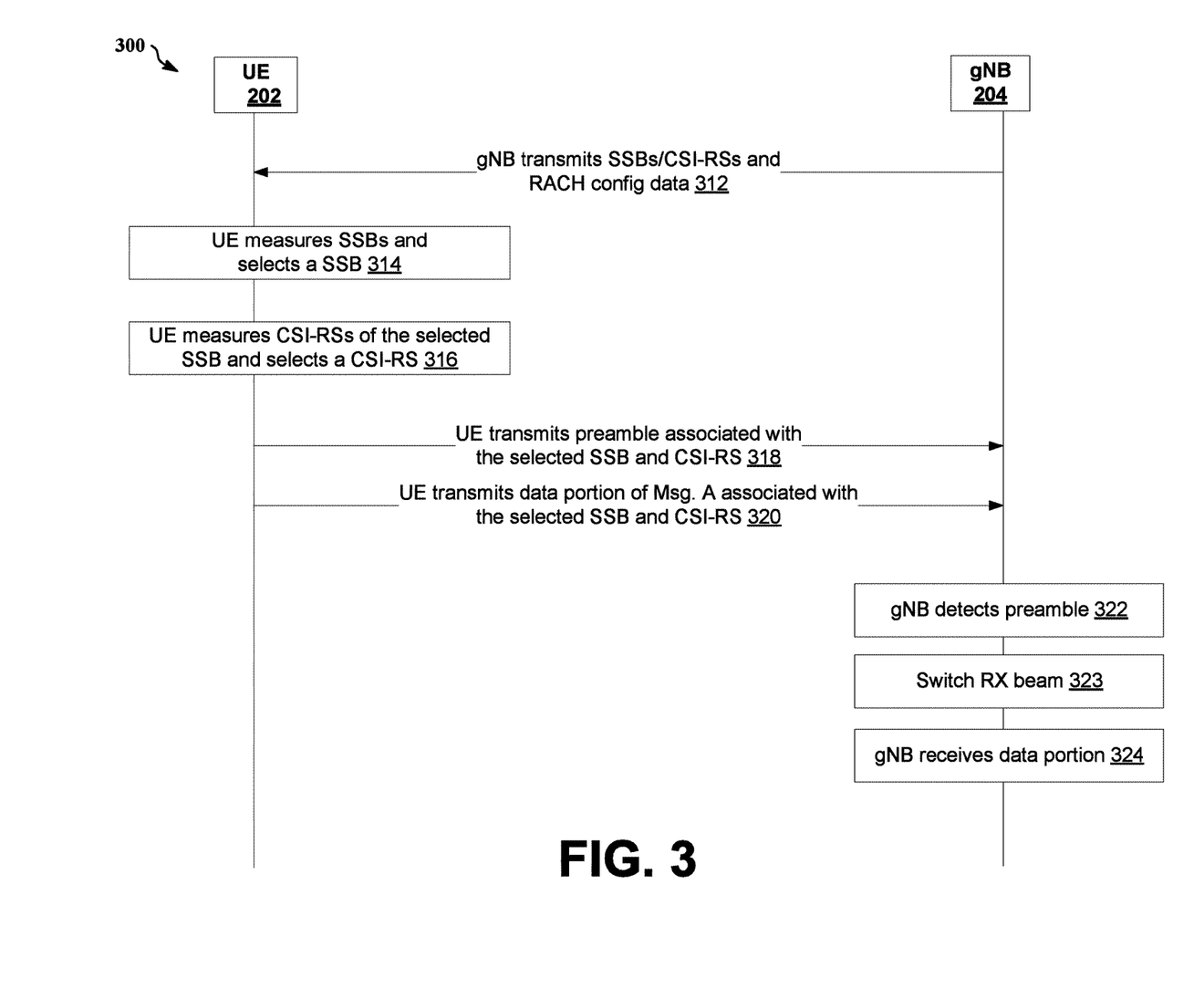
FIG. 3 is a message flow diagram illustrating beam refinement in a two-step random access channel (RACH) procedure, according to one example implementation.

FIG. 3 is a message flow diagram 500 illustrating beam refinement in/of a two-step random access channel (RACH) procedure, according to one example implementation.

Figure 4:
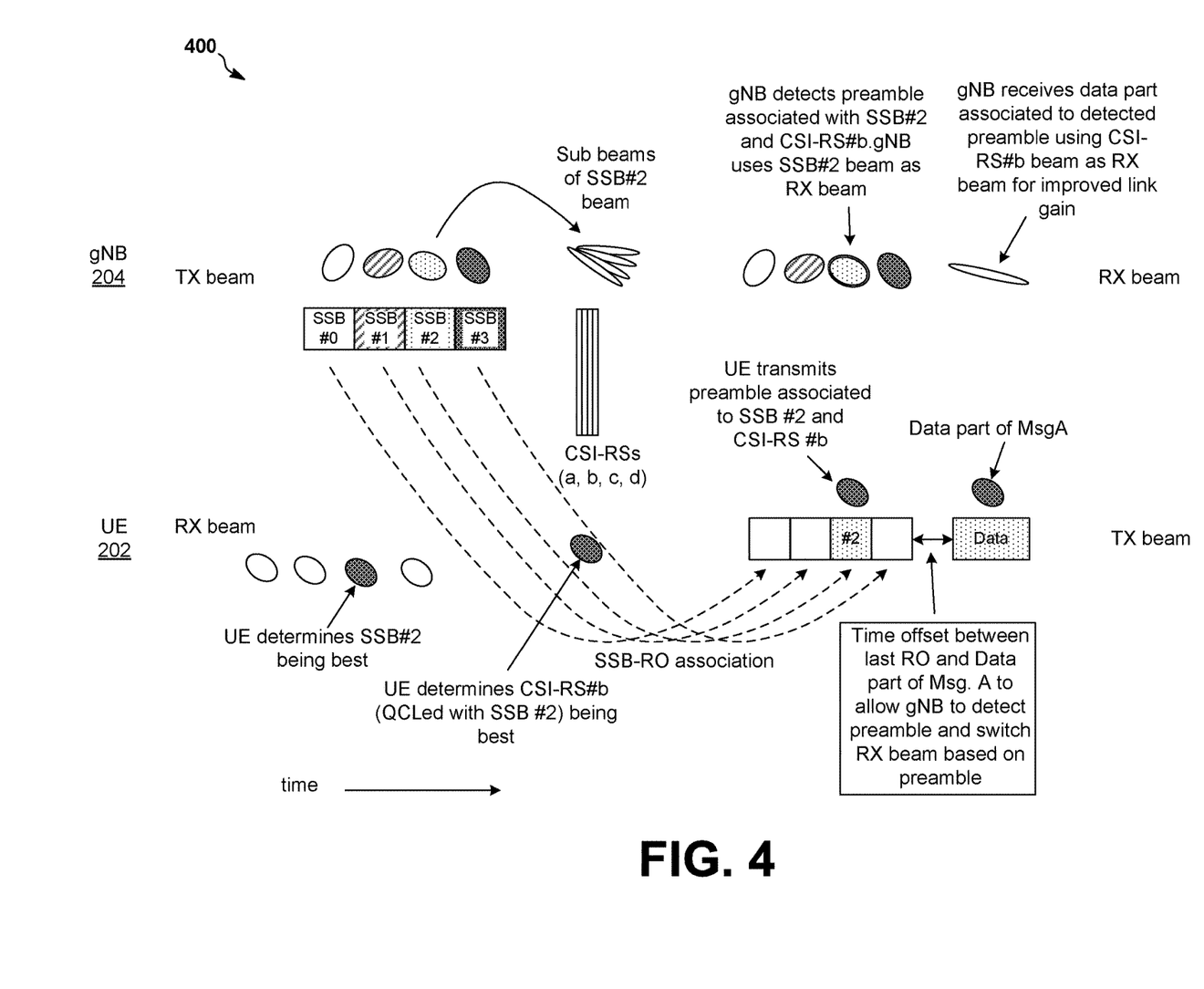
FIG. 4 is a diagram illustrating beam refinement in a two-step random access channel (RACH) procedure, according to one example implementation.

At 312, a gNB, e.g., gNB 204 transmits synchronization signal blocks (SSBs) to a UE, e.g., UE 202. In some implementations, a SSB may include: a) a synchronization signal with a primary synchronization signal (PSS) and a secondary synchronization signal (SSS) and b) a physical broadcast channel (PBCH) and a demodulation reference signal (DMRS) for decoding the PBCH. In one example implementation, the gNB 204 may transmit a plurality of SSB, e.g., 4 TX beams for 4 SSBs as illustrated in FIG. 4. The configuration of SSBs and associated channel state information-reference signals (CSI-RSs), preambles, and/or resources/resource sets are further described below in detail in reference to FIG. 5.

The gNB 204 may transmit RACH configuration data to UE 202. For example, in some implementations, the RACH configuration data may include information on: resources for random access channel (RACH) occasions (ROs), mapping preambles to the random access channel (RACH) occasions (ROs), mapping the plurality of synchronization signal blocks (SSBs) to the random access channel (RACH) occasions (ROs), resources for transmitting the second portion of the first message, transmission parameters (e.g., modulation coding schemes) for the second portion of the first message, and/or configuration of the resources or resource sets associated with the plurality of channel state information-reference signals (CSI-RSs) and/or the plurality of the synchronization signal blocks (SSBs). In an example implementation, gNB 204 may also indicate CSI-RS and SSB association to UE 202 so that the UE can receive and measure CSI-RSs and/or report about the CSI-RSs to the gNB. In some implementations, gNB 204 may transmit RACH configuration data via, for example, remaining minimum system information (RMSI), broadcasted system information, or using dedicated signaling.

In some implementations, gNB 204 may configure multiple CSI-RS resource sets with repetition enabled (e.g., turned ON) including CSI-RSs/SSB associations so that UE 202 can refine transmit beams for transmitting the second portion (e.g., data portion) of the first message. Since preambles corresponding to SSBs would be divided into subsets where each subset would correspond to certain CSI-RS resource set, the UE would be able to use refined (e.g., narrower) transmit beams for transmitting the second portion of the first message.

At 314, UE 202 may measure signal strengths of the received SSBs. For example, UE 202 may measure reference signal receive power (RSRP) values of the SSBs. In an example implementation, UE 202 may measure RSRP values of SSBs 1-4 (of FIG. 4) and compare the measured RSRP values with a threshold RSRP value. UE 202, based on the measured RSRP values, may select a SSB with the highest value (e.g., SSB2) for executing the two-step RACH procedure. In some implementations, UE 202 may select a SSB with a second, third, etc. highest value depending on the configuration. In some implementations, UE 202 may select any SSB if no SSB has a RSRP value above the threshold.

Figure 5:
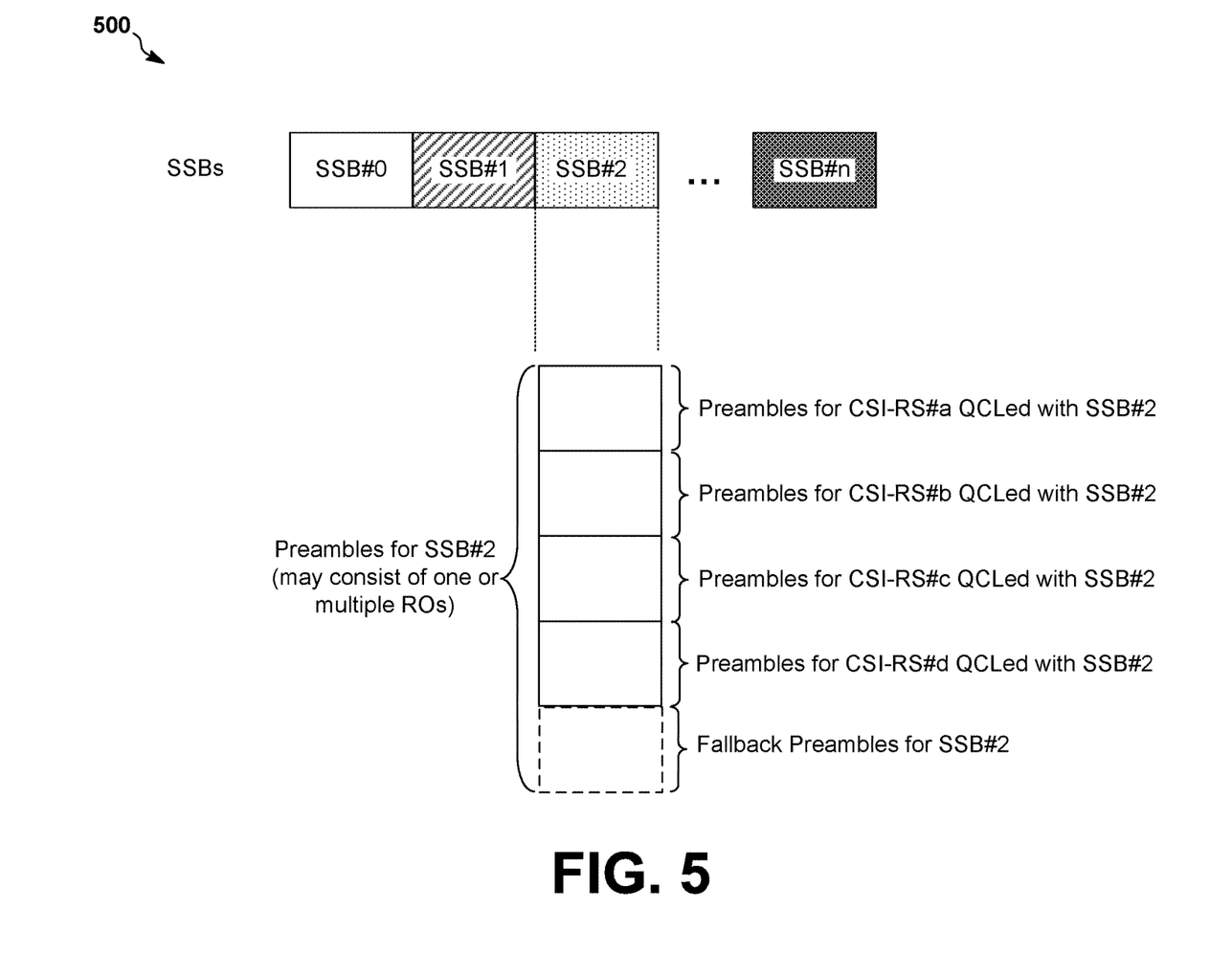
FIG. 5 is a block diagram illustrating preambles associated with synchronization signal blocks (SSBs) and/or channel state information-reference signals (CSI-RSs), according to one example implementation.

At 316, UE 202 may measure the signal strengths of CSI-RSs of the selected SSB. In one example implementation, UE 202 may measure signal strengths of CSI-RSs (e.g., CSI-RSs a-d) associated with the selected SSB (e.g., SSB2). As described below in reference to FIG. 5, a set of PRACH preambles may be associated with a SSB. The set of PRACH preambles associated with a SSB may be divided into sub-sets of preambles. In one example implementation, a sub-set of preambles may be associated with a CSI-RS. Each preamble sub-set may represent a narrower beam (e.g., a narrower TX/RX beam) relative to the TX/RX beam of the associated SSB. As shown in FIG. 5, in an example implementation, SSB #2 may be configured with four CSI-RSs, e.g., CSI-RS # a, CSI-RS # b, CSI-RS # c, and CSI-RS # d, and each of the CSI-RSs may be associated with a sub-set of the preambles. The beams associated with a CSI-RS of a SSB may be considered as sub-beams of the SSB.

For example, a UE may first determine a RX beam for a certain SSB by determining a suitable beam when receiving the SSB. The gNB may then transmit multiple CSI-RS resources each with narrower TX beams than the beams used for the transmission of the SSB, and the TX beams for the CSI-RSs are sub-beams of the SSB TX beam. Furthermore, the CSI-RS transmissions may be repeated in time domain. The UE then tries different, narrower, RX beams to receive the CSI-RSs and can determine the refined RX beam specifically for the certain CSI-RS resource.

In an example implementation, UE 202 may measure RSRP values of the CSI-RSs of the selected SSB (e.g., SSB #2) and compare the measured RSRP values with a threshold value (e.g., may be same or different (higher/lower) than the threshold value used for comparing the RSRP values of SSBs). UE 202, based on the measured RSRP values, may select a CSI-RS with the highest value (e.g., CSI-RSb) for executing the two-step RACH procedure. In some implementations, UE 202 may select a CSI-RS with a second, third, etc. highest value depending on the configuration. In some implementations, UE 202 may select any CSI-RS associated with the SSB if no CSI-RS of the associated SSB has a RSRP value above the threshold.

At 318, UE 202 transmits a first portion of the first message (e.g., preamble). In one example implementation, UE 202 may transmit the preamble associated with the selected CSI-RS (e.g., CSI-RS # b of SSB #2). At 320, UE 202 may transmit a second portion of the first message (e.g., data portion) to the UE. In one example implementation, UE 202 may transmit the data portion of the first message to gNB 202.

At 322, gNB 204 receives the first portion of the first message (e.g. the preamble) and determines that the preamble is associated with CSI-RS # b of SSB #2 (e.g., since gNB 204 sent the RACH configuration data to UE 202, gNB 204 is aware of this mapping and can perform this determination). At 324, gNB 204 receives the second portion of the first message (e.g., data portion). In some implementations, gNB 204 may receive the data portion of the first message using a RX beam associated with the first portion of the first message (e.g., CSI-RS # b beam as RX beam for improved link gain, selected CSI-RS # b associated with the selected SSB #2). In other words, UE 202 may transmit the preamble (associated with CSI-RS # b and SSB #2) which indicates to gNB 204 the preferred CSI-RS resource and thus indicating which refined RX beam can be used for data part reception of the first message.

In some implementations, at 323, gNB 204 may switch RX beams for receiving the second portion of the first message. For example, gNB 204 may switch from RX beam associated with SSB #2 to RX beam associated with CSR-RS # b to improve link gain so that gNB 204 can receive and/or decode the data portion of the first message. In an example implementation, if gNB 202 is successful in receiving/decoding of the first portion of the first message but fails in receiving/decoding of the second portion of the first message, gNB 204 may consider the first portion of the first message of the two-step RACH procedure as a first message (Msg. 1) of four-step RACH procedure and gNB 204/UE 202 may fall back to the four-step procedure by proceeding with the Step 2 of the four-step RACH procedure (e.g., gNB 204 sending Msg. 2 of the four-step procedure to UE 202).

In some implementations, UE 202 may include (e.g., insert) a time offset after the last RO of the preamble and prior to the first RO of the second portion of the first message. This time offset provides an opportunity (e.g., time) to gNB 204 to allow the gNB to switch the RX beam to a narrower beam, e.g., narrower beam associated with the selected CSI-RS (e.g., CSI-RS # b, instead of the wider SSB #2 beam) for improved link gain.

In some implementations, the first portion (e.g., preamble) and the second portion (e.g., data portion) of the message may be multiplexed prior to transmission. For example, the first portion and the second portion of the first may be time division multiplexed (TDM) prior to transmission to the gNB, as described below in reference to FIG. 6.

In some implementations, the signal strength of a SSB may be higher than signal strength of any CSI-RS associated with that SSB (e.g., UE may be in between two CSI-RS beams and the wider SSB beam may be stronger than the CSI-RS beams for that UE). In such an implementation, one subset of preambles associated to the SSB may point to SSB itself and the UE can select preambles accordingly (e.g., referred to as "Fallback preambles for SSB #2" in FIG. 5) when SSB is stronger than any associated CSI-RS.

Thus, refined beams may be used during a two-step RACH procedure to achieve lower control overhead and/or lower latency.

FIG. 4 is a diagram 400 illustrating beam refinement in a two-step random access channel (RACH) procedure, according to one example implementation. FIG. 4 illustrates transmission of SSBs/CSI-RSs by gNB 204, reception of SSBs/CSI-RSs by UE 202, selection of RX beam at UE 202 based on RSRP values of SSBs/CSI-RSs, transmission of preamble/data portions of a first message of a two-step procedure, and reception of preamble/data portions by gNB 204, as described in detail above in reference to FIG. 3.

FIG. 5 is a block diagram 500 illustrating preambles associated with SSBs and/or CSI-RSs, according to one example implementation.

Physical random access channel (PRACH) preambles are provided (e.g., configured) for SSBs transmitted by a cell (e.g., gNB 204) so that cell wide coverage is provided in spatial domain for PRACH reception. In a beamforming system (e.g., analog beamforming system), time domain resources may be needed for a longer time when a narrow beam is used (e.g., the narrower the beam, the longer time the domain resources are needed). This may result in significant overhead in the case of PRACH resources. Therefore, the width of PRACH RX beams should be as wide as possible to be able to cover as large a spatial domain aperture (at once) as possible while ensuring that the gain of the beam used during the reception of the preambles has high enough detection performance for cell edge UEs. In other words, using (very) narrow beams for PRACH preamble reception and/or for SSB transmissions may lead to significant system overhead.

FIG. 5 illustrates SSBs (e.g., SSB #0, SSB #1, SSB #2, SSB # n) transmitted by gNB 204. In some implementations, a set of PRACH preambles may be associated (e.g., based on configuration) with a SSB and the set of preambles associated with the SSB may be associated with a plurality of reference signals (e.g., channel state information-reference signals (CSI-RSs). For example, a set of preambles (e.g., P) may be associated with SSB #2 and a sub-sets of preambles P may be associated with each of the CSI-RSs (e.g., CSI-RS # a, CSI-RS # b, CSI-RS # c, and CSI-RS # d). In some implementations, the CSI-RSs may represent more narrow (e.g., narrower) TX/RX beams than the beams used for associated SSB TX beam and preamble RX beam. In some implementations, as described above, the signal strength of a SSB may be higher than signal strength of any CSI-RS associated with that SSB (e.g., UE may be in between two CSI-RS beams and the wider SSB beam may be stronger than the CSI-RS beams for that UE). In such an implementation, one subset of preambles associated to the SSB may point to SSB itself and the UE can select preambles accordingly (e.g., referred to as "Fallback preambles for SSB #2" in FIG. 5) when SSB is stronger than any associated CSI-RS.

In some implementations, the set of preambles associated with a SSB may be located within one RACH occasion (RO) or within multiple ROs. In addition, in one RO, there may be sets (of preambles) associated with different SSBs.

In some implementations, the CSI-RS beams may be considered as sub-beams of SSB beams. In other words, SSB may act as spatial domain quasi co-location source (e.g., QCL type D—spatial Rx parameter) for the associated CSI-RSs. For example, spatial domain source to determine TX beam for the PRACH preamble transmission is SSB and/or spatial domain source to determine TX beam for the data part (PUSCH) transmission can be SSB or CSI-RS. In other words, beams associated with CSI-RS # a, CSI-RS # b, CSI-RS # c, and CSI-RS # d may be considered as sub-beams of a beam associated with SSB #2.

Figure 6:
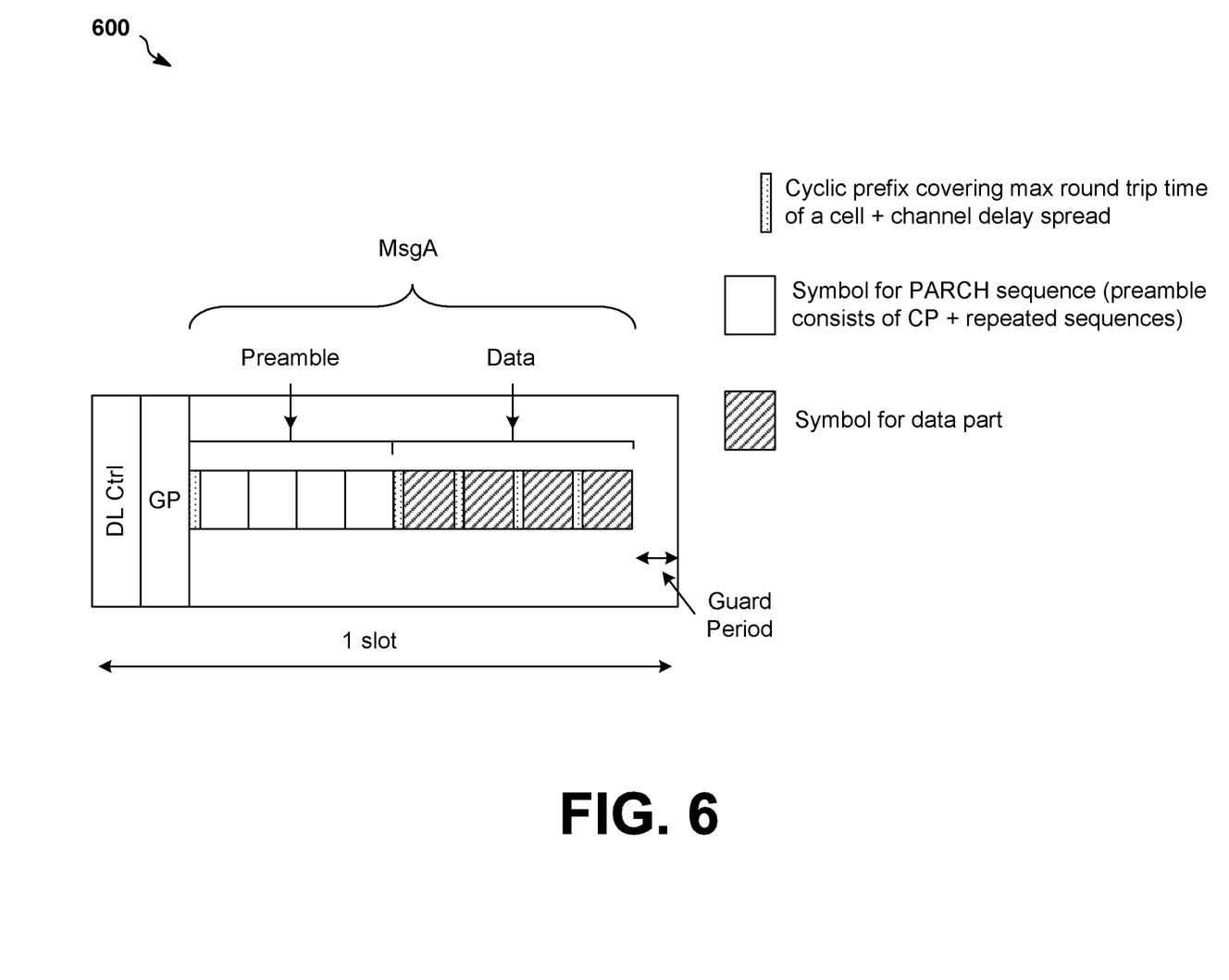
FIG. 6 is a block diagram illustrating a structure of a first message of a two-step random access procedure (RACH), according to one example implementation.

FIG. 6 is a block diagram 600 illustrating a structure of a first message of a two-step random access procedure (RACH), according to one example implementation. In one example implementation, FIG. 6 shows resource allocation for the first message (e.g., Msg. A) for a preamble and data portion within one slot (e.g., 0.5 ms) with time division multiplexing between a preamble signal and the data signal.

Figure 7:
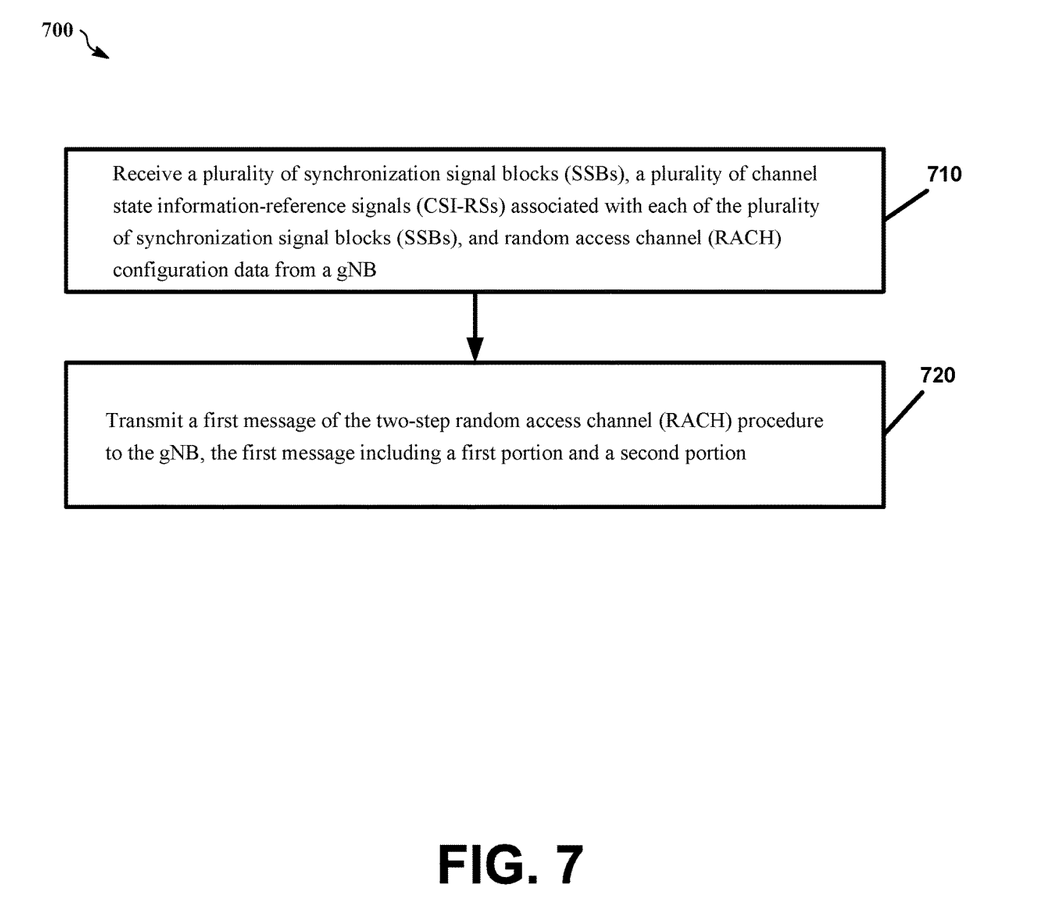
FIG. 7 is a flow chart (method) illustrating an improved/enhanced two-step random access channel (RACH) procedure, according to an example implementation.

FIG. 7 is a flow chart 700 illustrating beam refinement in a two-step random access channel (RACH) procedure, according to an example implementation.

At block 710, a UE (e.g., UE 202) may receive a plurality of synchronization signal blocks (SSBs), a plurality of channel state information-reference signals (CSI-RSs) associated with each of the plurality of synchronization signal blocks (SSBs), and random access channel (RACH) configuration data from a gNB, the random access channel (RACH) configuration data associated with a two-step random access channel (RACH) procedure. In an example implementation, UE 202 may receive RACH configuration data, SSBs and CSI-RSs (as shown in FIGS. 3-6).

At block 720, the UE may transmit a first message of the two-step random access channel (RACH) procedure to the gNB, the first message including a first portion and a second portion. In an example implementation, UE 202 may transmit a first message (Msg. A of FIG. 2) which may include a first portion (e.g., a preamble) and a second portion (e.g., a data portion).

In some implementations, the preamble may be associated with a selected channel state information-reference signal (CSI-RS) of the plurality of channel state information-reference signals (CSI-RSs) and the selected channel state information-reference signal (CSI-RS) further associated with a selected synchronization signal block (SSB) of the plurality of synchronization signal blocks (SSBs). In some implementations, the data portion may be associated with the preamble and transmitted using pre-configured or pre-allocated resources.

Thus, as described above, a UE may transmit a first message, which includes a preamble and a data portion, of a two-step procedure to a gNB, using beam refinement.

Example 1

A method of communications, comprising: receiving, by a user equipment (UE), a plurality of synchronization signal blocks (SSBs), a plurality of channel state information-reference signals (CSI-RSs) associated with each of the plurality of synchronization signal blocks (SSBs), and random access channel (RACH) configuration data from a gNB, the random access channel (RACH) configuration data associated with a two-step random access channel (RACH) procedure; and transmitting, by the user equipment (UE), a first message of the two-step random access channel (RACH) procedure to the gNB, the first message including a first portion and a second portion, wherein: the first portion includes a preamble associated with a selected channel state information-reference signal (CSI-RS) of the plurality of channel state information-reference signals (CSI-RSs), the selected channel state information-reference signal (CSI-RS) further associated with a selected synchronization signal block (SSB) of the plurality of synchronization signal blocks (SSBs), and the second portion includes data associated with the preamble, and the data transmitted using pre-configured or pre-allocated resources.

Example 2

According to an example aspect of the method of Example 1, further comprising: measuring reference signal receive power (RSRP) values of the plurality of synchronization signal blocks (SSBs); selecting a synchronization signal block (SSB) of the plurality of synchronization signal blocks (SSBs) based on the measured reference signal receive power (RSRP) values of the plurality of synchronization signal blocks (SSBs); measuring reference signal receive power (RSRP) values of a plurality of channel state information-reference signals (CSI-RSs) associated with the selected synchronization signal block (SSB); and selecting the channel state information-reference signal (CSI-RS) of the plurality of channel state information-reference signals (CSI-RSs) based on the measured reference signal receive power (RSRP) values of the plurality of channel state information-reference signals (CSI-RSs).

Example 3

According to an example aspect of the method of Example 1, further comprising: measuring reference signal receive power (RSRP) values of the plurality of channel state information-reference signals (CSI-RSs); selecting the channel state information-reference signal (CSI-RS) of the plurality of channel state information-reference signals (CSI-RSs) based on the measured reference signal receive power (RSRP) values of the plurality of channel state information-reference signals (CSI-RSs); and selecting the synchronization signal block (SSB) associated with the selected channel state information-reference signal (CSI-RS).

Example 4

According to an example aspect of the method of Examples 1-3, further comprising: selecting, by the user equipment (UE), a resource or resource set associated with the selected channel state information-reference signal (CSI-RS) and/or the selected synchronization signal block (SSB).

Example 5

According to an example aspect of the method of Example 4, wherein the first portion is transmitted using the selected resource or resource set.

Example 6

According to an example aspect of the method of Example 4 or 5, wherein the selected resource or resource set indicates, to the gNB, the selected channel state information-reference signal (CSI-RS) used for determining a transmit beam for transmitting the second portion of the first message.

Example 7

According to an example aspect of the method of Examples 1-6, wherein a time offset is present between the first and the second portions of the first message being transmitted to the gNB.

Example 8

According to an example aspect of the method of Example 1, wherein the random access channel (RACH) configuration data includes information on: resources for random access channel (RACH) occasions (ROs); mapping preambles to the random access channel (RACH) occasions (ROs); mapping the plurality of synchronization signal blocks (SSBs) to the random access channel (RACH) occasions (ROs); resources for transmitting the second portion of the first message; and transmission parameters for the second portion of the first message.

Example 9

According to an example aspect of the method of Example 8, wherein the transmission parameters include modulation coding scheme (MCS) parameters.

Example 10

According to an example aspect of the method of Example 1, 4, or 8, wherein the random access channel (RACH) configuration data includes information on: configuration of the resources or resource sets associated with the plurality of channel state information-reference signals (CSI-RSs) and/or the plurality of the synchronization signal blocks (SSBs).

Example 11

According to an example aspect of the method of Example 1, wherein the transmitting of the first message further comprises: time-division multiplexing (TDM) of the first and second portions of the first message.

Example 12

An apparatus comprising at least one processor and at least one memory including computer instructions, when executed by the at least one processor, cause the apparatus to perform a method of any of Examples 1-11.

Example 13

An apparatus comprising means for performing a method of any of Examples 1-11.

Example 14

A non-transitory computer-readable storage medium having stored thereon computer executable program code which, when executed on a computer system, causes the computer system to perform the steps of any of Examples 1-11.

Figure 8:
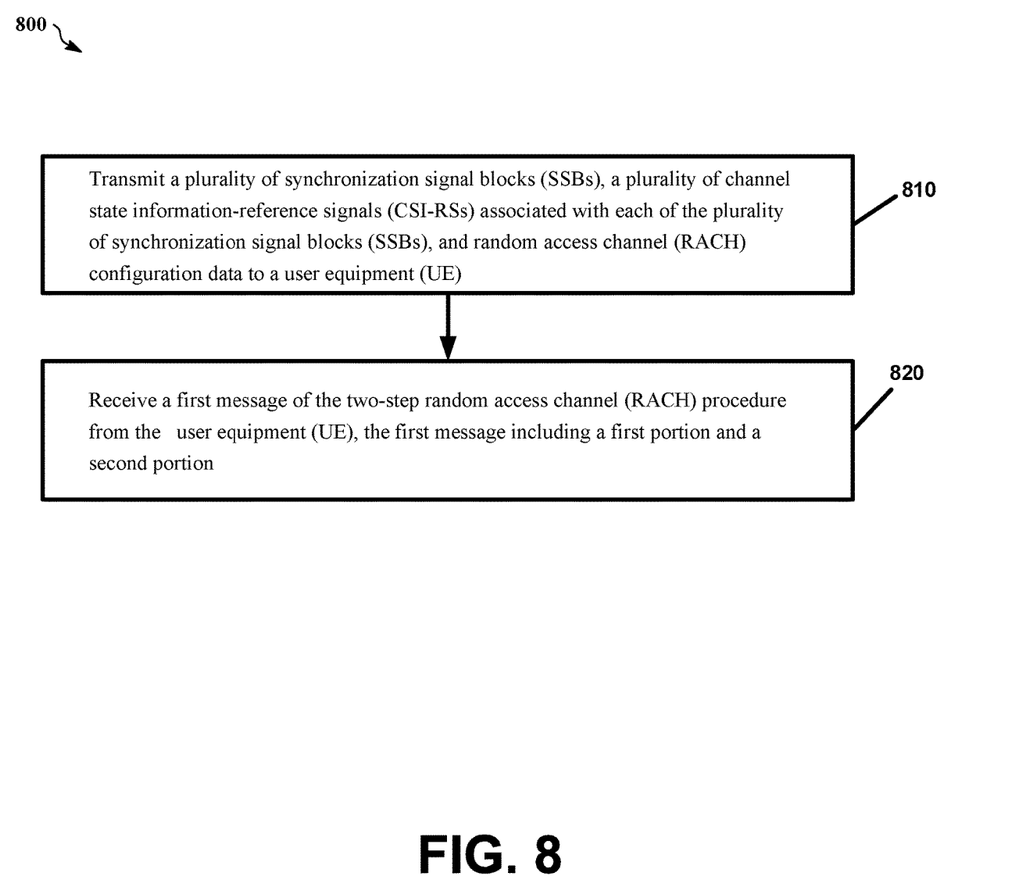
FIG. 8 is a flow chart illustrating an improved/enhanced two-step random access channel (RACH) procedure, according to another example implementation.

FIG. 8 is a flow chart 800 illustrating beam refinement in a two-step random access channel (RACH) procedure, according to an example implementation.

At block 810, a gNB (e.g., gNB 204) may transmit a plurality of synchronization signal blocks (SSBs), a plurality of channel state information-reference signals (CSI-RSs) associated with each of the plurality of synchronization signal blocks (SSBs), and random access channel (RACH) configuration data from a gNB, the random access channel (RACH) configuration data associated with a two-step random access channel (RACH) procedure. In an example implementation, gNB 204 may transmit RACH configuration data, SSBs and CSI-RSs (as shown in FIGS. 3-6).

At block 820, the gNB may receive a first message of the two-step random access channel (RACH) procedure, the first message including a first portion and a second portion. In an example implementation, gNB may receive a first message (Msg. A of FIG. 2) which may include a first portion (e.g., a preamble) and a second portion (e.g., a data portion).

In some implementations, the preamble may be associated with a selected channel state information-reference signal (CSI-RS) of the plurality of channel state information-reference signals (CSI-RSs) and the selected channel state information-reference signal (CSI-RS) further associated with a selected synchronization signal block (SSB) of the plurality of synchronization signal blocks (SSBs). In some implementations, the data portion may be associated with the preamble and transmitted using pre-configured or pre-allocated resources.

Thus, as described above, a gNB may receive a first message, which includes a preamble and a data portion, of a two-step procedure from a UE, using beam refinement.

Example 15

A method of communications, comprising: transmitting, by a gNB, a plurality of synchronization signal blocks (SSBs), a plurality of channel state information-reference signals (CSI-RSs) associated with each of the plurality of synchronization signal blocks (SSBs), and random access channel (RACH) configuration data to a user equipment (UE), the random access channel (RACH) configuration data associated with a two-step random access channel (RACH) procedure; and receiving, by the gNB, a first message of the two-step random access channel (RACH) procedure to the gNB, the first message including a first portion and a second portion, wherein: the first portion includes a preamble associated with a selected channel state information-reference signal (CSI-RS) of the plurality of channel state information-reference signals (CSI-RSs), the selected channel state information-reference signal (CSI-RS) further associated with a selected synchronization signal block (SSB) of the plurality of synchronization signal blocks (SSBs), the selections performed by the user equipment (UE), and the second portion includes data associated with the two-step random access channel (RACH) procedure, the data transmitted, by the user equipment (UE), using pre-configured or pre-allocated resources.

Example 16

An apparatus comprising at least one processor and at least one memory including computer instructions, when executed by the at least one processor, cause the apparatus to perform a method of any of Examples 1-15.

Example 17

An apparatus comprising means for performing a method of any of Examples 1-15.

Example 18

A non-transitory computer-readable storage medium having stored thereon computer executable program code which, when executed on a computer system, causes the computer system to perform the steps of any of Examples 1-15.

Figure 9:
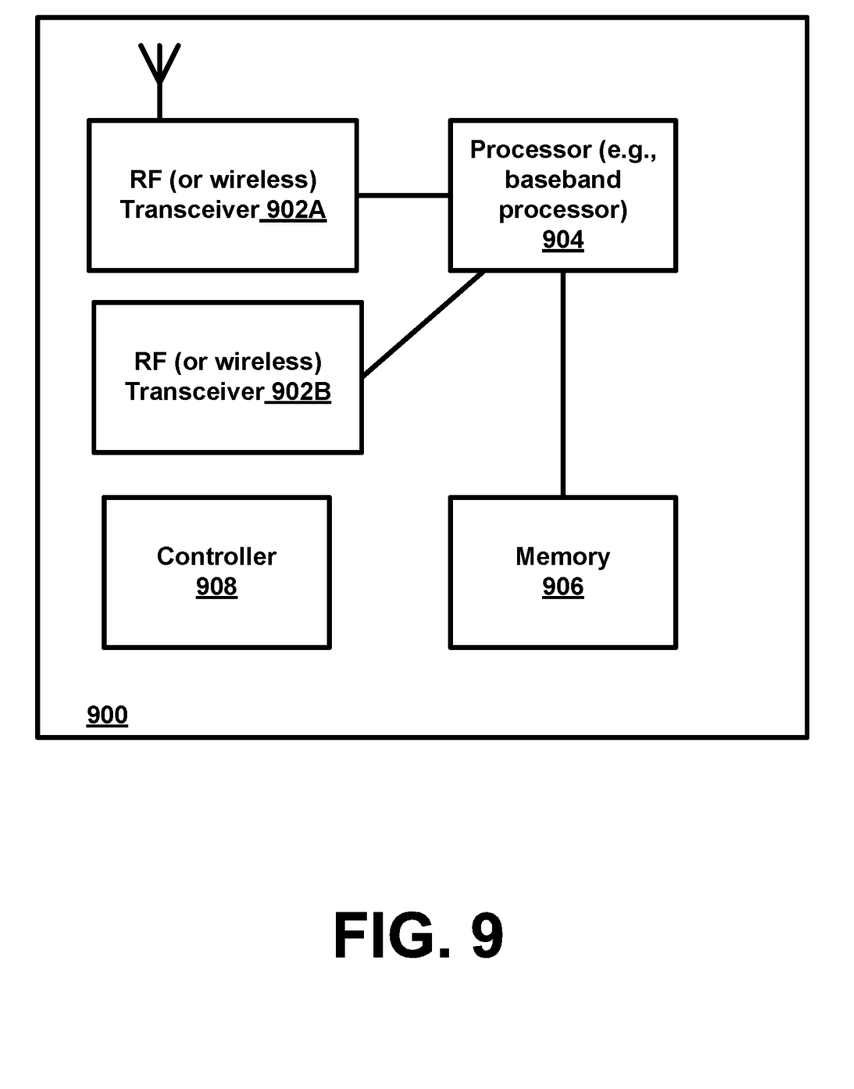
FIG. 9 is a block diagram of a node or wireless station (e.g., base station/access point or mobile station/user device/UE), according to an example implementation.

FIG. 9 is a block diagram of a wireless station (e.g., user equipment (UE)/user device or AP/gNB) 900 according to an example implementation. The wireless station 900 may include, for example, one or more RF (radio frequency) or wireless transceivers 902A, 902B, where each wireless transceiver includes a transmitter to transmit signals and a receiver to receive signals. The wireless station also includes a processor or control unit/entity (controller) 904/908 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software. Moreover, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
   receiving, by a user equipment (UE), a plurality of synchronization signal blocks (SSBs), a plurality of channel state information-reference signals (CSI-RSs) associated with each of the plurality of synchronization signal blocks (SSBs), and random access channel (RACH) configuration data from a gNB, the random access channel (RACH) configuration data associated with a two-step random access channel (RACH) procedure; and
   transmitting, by the user equipment (UE), a first message of the two-step random access channel (RACH) procedure to the gNB, the first message including a first portion and a second portion, wherein:

the first portion includes a preamble associated with a selected channel state information-reference signal (CSI-RS) of the plurality of channel state information-reference signals (CSI-RSs), the selected channel state information-reference signal (CSI-RS) further associated with a selected synchronization signal block (SSB) of the plurality of synchronization signal blocks (SSBs), the second portion includes data associated with the preamble, the data transmitted using pre-configured or pre- allocated resources, and a resource or resource set associated with the selected channel state information- reference signal (CSI-RS) and/or the selected synchronization signal block (SSB) is selected, the first portion transmitted using the selected resource or resource set, and the selected resource or resource set indicating, to the gNB, the selected channel state information-reference signal (CSI-RS) used for determining a transmit beam for transmitting the second portion of the first message.

2. The method of claim 1, further comprising:

measuring reference signal receive power (RSRP) values of the plurality of synchronization signal blocks (SSBs);

selecting a synchronization signal block (SSB) of the plurality of synchronization signal blocks (SSBs) based on the measured reference signal receive power (RSRP) values of the plurality of synchronization signal blocks (SSBs);

measuring reference signal receive power (RSRP) values of a plurality of channel state information-reference signals (CSI-RSs) associated with the selected synchronization signal block (SSB); and selecting the channel state information-reference signal (CSI-RS) of the plurality of channel state information-reference signals (CSI-RSs) based on the measured reference signal receive power (RSRP) values of the plurality of channel state information-reference signals (CSI-RSs).

3. The method of claim 1, further comprising:

measuring reference signal receive power (RSRP) values of the plurality of channel state information-reference signals (CSI-RSs);

selecting the channel state information-reference signal (CSI-RS) of the plurality of channel state information-reference signals (CSI-RSs) based on the measured reference signal receive power (RSRP) values of the plurality of channel state information-reference signals (CSI-RSs); and selecting the synchronization signal block (SSB) associated with the selected channel state information-reference signal (CSI-RS).

4. The method of claim 1, wherein a time offset is present between the first and the second portions of the first message being transmitted to the gNB.

5. The method of claim 1, wherein the random access channel (RACH) configuration data includes information on:

resources for random access channel (RACH) occasions (ROs);

mapping preambles to the random access channel (RACH) occasions (ROs);

mapping the plurality of synchronization signal blocks (SSBs) to the random access channel (RACH) occasions (ROs);

resources for transmitting the second portion of the first message; and transmission parameters for the second portion of the first message.

6. The method of claim 5, wherein the transmission parameters include modulation coding scheme (MCS) parameters.

7. The method of claim 1, wherein the random access channel (RACH) configuration data includes information on:

configuration of the resources or resource sets associated with the plurality of channel state information-reference signals (CSI-RSs) and/or the plurality of the synchronization signal blocks (SSBs).

8. The method of claim 1, wherein the transmitting of the first message further comprises:

time-division multiplexing (TDM) of the first and second portions of the first message.

9. A non-transitory computer-readable storage medium having stored thereon computer executable program code which, when executed on a computer system, causes the computer system to perform the method of claim 1.

10. An apparatus comprising at least one processor, and at least one memory including computer program code, the at least one memory and the computer program code configured to, with the at least one processor, cause the apparatus at least to:

receive, a plurality of synchronization signal blocks (SSBs), a plurality of channel state information-reference signals (CSI-RSs) associated with each of the plurality of synchronization signal blocks (SSBs), and random access channel (RACH) configuration data from a gNB, the random access channel (RACH) configuration data associated with a two-step random access channel (RACH) procedure; and transmit, a first message of the two-step random access channel (RACH) procedure to the gNB, the first message including a first portion and a second portion, wherein:

the first portion includes a preamble associated with a selected channel state information-reference signal (CSI-RS) of the plurality of channel state information- reference signals (CSI-RSs), the selected channel state information-reference signal (CSI-RS) further associated with a selected synchronization signal block (SSB) of the plurality of synchronization signal blocks (SSBs), and the second portion includes data associated with the preamble, the data transmitted using pre-configured or pre- allocated resources, and a resource or resource set associated with the selected channel state information- reference signal (CSI-RS) and/or the selected synchronization signal block (SSB) is selected, the first portion transmitted using the selected resource or resource set, and the selected resource or resource set indicating, to the gNB, the selected channel state information-reference signal (CSI-RS) used for determining a transmit beam for transmitting the second portion of the first message.

11. A method of communications, comprising:

transmitting, by a gNB, a plurality of synchronization signal blocks (SSBs), a plurality of channel state information-reference signals (CSI-RSs) associated with each of the plurality of synchronization signal blocks (SSBs), and random access channel (RACH) configuration data to a user equipment (UE), the random access channel (RACH) configuration data associated with a two-step random access channel (RACH) procedure; and receiving, by the gNB, a first message of the two-step random access channel (RACH) procedure to the gNB, the first message including a first portion and a second portion, wherein:

the first portion includes a preamble associated with a selected channel state information-reference signal (CSI-RS) of the plurality of channel state information-reference signals (CSI-RSs), the selected channel state information-reference signal (CSI-RS) further associated with a selected synchronization signal block (SSB) of the plurality of synchronization signal blocks (SSBs), the selections performed by the user equipment (UE), the second portion includes data associated with the two-step random access channel (RACH) procedure, the data transmitted, by the user equipment (UE), using pre-configured or pre-allocated resources, and a resource or resource set associated with the selected channel state information- reference signal (CSI-RS) and/or the selected synchronization signal block (SSB) is selected by the user equipment (UE), the first portion received using the selected resource or resource set, and the selected resource or resource set indicating, to the gNB, the selected channel state information-reference signal (CSI-RS) used for determining a transmit beam for transmitting the second portion of the first message.

12. A non-transitory computer-readable storage medium having stored thereon computer executable program code which, when executed on a computer system, causes the computer system to perform the method of claim 11.

13. An apparatus comprising at least one processor, and at least one memory including computer program code, the at least one memory and the computer program code configured to, with the at least one processor, cause the apparatus at least to:

transmit, a plurality of synchronization signal blocks (SSBs), a plurality of channel state information-reference signals (CSI-RSs) associated with each of the plurality of synchronization signal blocks (SSBs), and random access channel (RACH) configuration data to a user equipment (UE), the random access channel (RACH) configuration data associated with a two-step random access channel (RACH) procedure; and receive, a first message of the two-step random access channel (RACH) procedure to the gNB, the first message including a first portion and a second portion, wherein:

the first portion includes a preamble associated with a selected channel state information-reference signal (CSI-RS) of the plurality of channel state information-reference signals (CSI-RSs), the selected channel state information-reference signal (CSI-RS) further associated with a selected synchronization signal block (SSB) of the plurality of synchronization signal blocks (SSBs), the selections performed by the user equipment (UE), the second portion includes data associated with the two-step random access channel (RACH) procedure, the data transmitted, by the user equipment (UE), using pre-configured or pre-allocated resources, and a resource or resource set associated with the selected channel state information-reference signal (CSI-RS) and/or the selected synchronization signal block (SSB) is selected by the user equipment (UE), the first portion received using the selected resource or resource set, and the selected resource or resource set indicating, to the gNB, the selected channel state information-reference signal (CSI-RS) used for determining a transmit beam for transmitting the second portion of the first message.

* * * * *